United States Patent
Shizuku

(10) Patent No.: US 9,136,546 B2
(45) Date of Patent: Sep. 15, 2015

(54) FUEL CELL STACK, MANUFACTURING METHOD OF FUEL CELL STACK AND REPLACEMENT METHOD OF MODULE AS CONSTITUENT OF FUEL CELL STACK

(75) Inventor: Fumishige Shizuku, Seto (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 231 days.

(21) Appl. No.: 13/519,739

(22) PCT Filed: May 26, 2010

(86) PCT No.: PCT/JP2010/003542
§ 371 (c)(1),
(2), (4) Date: Jun. 28, 2012

(87) PCT Pub. No.: WO2011/148421
PCT Pub. Date: Dec. 1, 2011

(65) Prior Publication Data
US 2012/0276469 A1    Nov. 1, 2012

(51) Int. Cl.
*H01M 8/02* (2006.01)
*H01M 8/24* (2006.01)
*H01M 8/10* (2006.01)

(52) U.S. Cl.
CPC .......... *H01M 8/0271* (2013.01); *H01M 8/0273* (2013.01); *H01M 8/0276* (2013.01); *H01M 8/241* (2013.01); *H01M 8/2465* (2013.01); *H01M 8/0284* (2013.01); *H01M 8/0286* (2013.01); *H01M 8/0297* (2013.01); *H01M 2008/1095* (2013.01); *Y02E 60/50* (2013.01)

(58) Field of Classification Search
CPC ..................................... H01M 8/0271–8/0286
USPC .......................... 429/460, 469, 508–511, 470
See application file for complete search history.

(56) References Cited

U.S. PATENT DOCUMENTS

| | | | |
|---|---|---|---|
| 2003/0082429 A1* | 5/2003 | Nishimura et al. | 429/35 |
| 2003/0235744 A1 | 12/2003 | Pflaesterer | |
| 2004/0137307 A1* | 7/2004 | Okonogi et al. | 429/37 |
| 2007/0210475 A1 | 9/2007 | Pflaesterer | |
| 2008/0220312 A1* | 9/2008 | Kato | 429/36 |

FOREIGN PATENT DOCUMENTS

| | | |
|---|---|---|
| CA | 2442067 A | 9/2001 |
| EP | 1320142 A2 | 6/2003 |

(Continued)

OTHER PUBLICATIONS

International Search Report issued Aug. 10, 2010 in PCT/JP2010/003542.

*Primary Examiner* — Maria J Laios
*Assistant Examiner* — Robert S Carrico
(74) *Attorney, Agent, or Firm* — Kenyon & Kenyon LLP

(57) ABSTRACT

A fuel cell stack includes: a first module configured to include an electrolyte membrane, an anode and a cathode; a second module configured to include a separator and placed adjacent to one surface of the first module via a first sealing member; and a third module configured to include a separator and placed adjacent to the other surface of the first module via a second sealing member. In this fuel cell stack, the first sealing member has the greater peel strength to the first module than the peel strength to the second module, and the second sealing member has the greater peel strength to the first module than the peel strength to the third module.

4 Claims, 12 Drawing Sheets

(56) References Cited

FOREIGN PATENT DOCUMENTS

| EP | 1391956 | A1 | 2/2004 |
| GB | 2368968 | A | 5/2002 |
| JP | 58-166676 | A | 10/1983 |
| JP | 2002-151112 | A | 5/2002 |
| JP | 2006-244765 | A | 9/2006 |
| WO | 2009-017208 | A1 | 2/2009 |

* cited by examiner

FUEL CELL STACK, MANUFACTURING METHOD OF FUEL CELL STACK AND REPLACEMENT METHOD OF MODULE AS CONSTITUENT OF FUEL CELL STACK

This is a 371 national phase application of PCT/JP2010/003542 filed 26 May 2010, the contents of which are incorporated herein by reference.

TECHNICAL FIELD

The present invention relates to the stack configuration of fuel cells.

BACKGROUND ART

As the stack configuration of fuel cells, the structure disclosed in PTL1 (given below) uses gaskets to seal in between fuel cells, each including an MEA (membrane electrode assembly) sandwiched between two opposed separators. According to the description of PTL1, the gasket is formed to have an approximately triangular cross section and a bottom surface adhering to one surface of each unit cell. The unit cells are stacked, such that the edges of their gaskets are directed in one single direction.

FIG. 1 illustrates an exemplary state in a prior art stack configuration, wherein a fuel cell 1 as a replacement object is withdrawn from a fuel cell stack 2. As shown in FIG. 1, withdrawal of the fuel cell 1 in the prior art stack configuration causes exposure of gaskets 4 adhering to an adjacent fuel cell 3 adjoining to the withdrawn fuel cell 1. Once the sealing members, such as gaskets, are exposed outside, however, dust and other foreign substances may adhere to the sealing members, which may decrease their sealing power and make it difficult to reuse such sealing members. This accordingly leads to the requirement of replacing the exposed gaskets 4. Replacement of only the gaskets 4 is, however, not allowed, but replacement of the fuel cell 3 with the gaskets 4 adhering thereto is needed. In this manner, replacement of the fuel cell 3 further requires replacement of an adjacent fuel cell under the fuel cell 3. Eventually, all the fuel cells located below the fuel cell 1 as the original replacement object are to be replaced in the state of FIG. 1. In other words, the prior art configuration needs replacement of a larger number of fuel cells than the number of fuel cells as the actual replacement object. This significantly increases the cost for repair of the fuel cell stack.

CITATION LIST

Patent Literature

PTL 1: JP 2006-244765A
PTL 2: JP 2002-151112A

SUMMARY OF INVENTION

Technical Problem

Considering the issues described above, the problem to be addressed by the present invention is to provide technology that enables cost-saving replacement of a module as the constituent of a fuel cell stack.

Solution to Problem

The present invention is made to address at least part of the problems described above, and may be realized as the following modes or application examples.

APPLICATION EXAMPLE 1

A fuel cell stack configured by stacking a plurality of modules, including: a first module configured to include an electrolyte membrane, an anode and a cathode; a second module configured to include a separator and placed adjacent to one surface of the first module via a first sealing member; and a third module configured to include a separator and placed adjacent to the other surface of the first module via a second sealing member, wherein the first sealing member has greater peel strength to the first module than peel strength to the second module, and the second sealing member has greater peel strength to the first module than peel strength to the third module.

According to such a constitution of the fuel cell stack, the first sealing member and the second sealing member provided to have the peel strengths mentioned above are placed between the first to the third modules. For replacement of the first module, this enables the first module to be withdrawn together with the first sealing member and the second sealing member from the fuel cell stack. This accordingly prevents exposure of the first sealing member and the second sealing member on the second and the third module adjacent to the withdrawn first module. Unlike the prior art configuration, this configuration does not require withdrawal of a larger number of fuel cells than the number of fuel cells as the actual replacement object and thus ensures cost-saving replacement of the module as the constituent of the fuel cell stack.

APPLICATION EXAMPLE 2

With the fuel cell stack as noted in Application Example 1, the first module, the second module and the third module respectively have one or more fuel cells, each fuel cell including the electrolyte membrane, the anode, the cathode and a pair of the separators placed across the electrolyte membrane, the anode and the cathode.

According to such a constitution, it is possible to make each module have one or more fuel cells, thus enabling any number of fuel cells to be set as the replacement unit of fuel cells to be replaced simultaneously.

APPLICATION EXAMPLE 3

With the fuel cell stack as noted in Application Example 1, the separator included in the second module is placed adjacent to either the anode or the cathode of the first module, and the separator included in the third module is placed adjacent to either the anode or the cathode of the first module.

According to such a constitution, it is possible to make the second module or the third module have only the separator. When the electrolyte membrane, the anode or the cathode is to be replaced, it is needed to replace only the first module.

APPLICATION EXAMPLE 4

With the fuel cell stack as noted in Application Examples 1 through 3, contact area of the first sealing member against the first module is greater than contact area of the first sealing member against the second module, and contact area of the second sealing member against the first module is greater than contact area of the second sealing member against the third module.

According to such a constitution, the contact area of each of the sealing members against the first module is greater than the contact areas against the other modules. This facilitates withdrawal of the first module together with the respective sealing members.

APPLICATION EXAMPLE 5

With the fuel cell stack as noted in Application Examples 1 through 4, the first sealing member is bonded to the first module and is cohesively stuck to the second module, and the second sealing member is bonded to the first module and is cohesively stuck to the third module.

According to such a constitution, the first sealing member and the second sealing member adhere to the first module but are cohesively stuck to the other modules. This facilitates withdrawal of the first module together with the respective sealing members.

APPLICATION EXAMPLE 6

With the fuel cell stack as noted in Application Examples 1 through 5, the second module and the third module have an identical configuration, and multiple sets of the first sealing member, the first module, the second sealing member and the second module arranged in this order are stacked.

According to such a constitution, when the second module is to be replaced, the first sealing member, the first module adjacent to the first sealing member, the second sealing member adjacent to the first module, the second module adjacent to the second sealing member, the first sealing member adjacent to the second module, the first module adjacent to the first sealing member and the second sealing member adjacent to the first module are collectively withdrawn. This aspect accordingly prevents the first sealing member and the second sealing member from being exposed in the fuel cell stack. Unlike the prior art configuration, this configuration does not require withdrawal of all the fuel cells present in one direction from the fuel cell of interest as the actual replacement object and thus ensures cost-saving replacement of the module as the constituent of the fuel cell stack.

The invention is not limited to the configuration of the fuel cell stack described above but may also be actualized by a manufacturing method of the fuel cell stack and a replacement method of a module as the constituent of the fuel cell stack as described below.

APPLICATION EXAMPLE 7

A manufacturing method of a fuel cell stack, comprising: (a) placing a first sealing member on one surface of a first module configured to include an electrolyte membrane, an anode and a cathode, while placing a second sealing member on the other surface of the first module; (b) placing a second module configured to include a separator on the one surface of the first module via the first sealing member; and (c) placing a third module configured to include a separator on the other surface of the first module via the second sealing member, wherein the first sealing member has greater peel strength to the first module than peel strength to the second module, and the second sealing member has greater peel strength to the first module than peel strength to the third module.

APPLICATION EXAMPLE 8

A replacement method of a module as a constituent of a fuel cell stack, wherein the fuel cell stack has a first module configured to include an electrolyte membrane, an anode and a cathode; a second module configured to include a separator and placed adjacent to one surface of the first module via a first sealing member; and a third module configured to include a separator and placed adjacent to the other surface of the first module via a second sealing member, wherein the first sealing member has greater peel strength to the first module than peel strength to the second module, and the second sealing member has greater peel strength to the first module than peel strength to the third module. For replacement of the first module, the replacement method includes: (a) withdrawing the first module, the first sealing member adjacent to the first module and the second sealing member adjacent to the first module together, as a first replacement unit module, from the fuel cell stack; and (b) placing a new first replacement unit module, instead of the withdrawn first replacement unit module, in the fuel cell stack.

APPLICATION EXAMPLE 9

With the fuel cell stack as noted in Application Examples 8, the second module and the third module have an identical configuration, and the fuel cell stack is constructed by stacking multiple sets of the first sealing member, the first module, the second sealing member and the second module arranged in this order. For replacement of the second module, the replacement method further includes: (c) withdrawing the first sealing member, the first module adjacent to the first sealing member, the second sealing member adjacent to the first module, the second module adjacent to the second sealing member, the first sealing member adjacent to the second module, the first module adjacent to the first sealing member and the second sealing member adjacent to the first module together, as a second replacement unit module, from the fuel cell stack; and (d) placing a new second replacement unit module, instead of the withdrawn second replacement unit module, in the fuel cell stack.

DESCRIPTION OF EMBODIMENTS

A. First Embodiment

The invention is described in detail with reference to embodiments.

Figure 1:
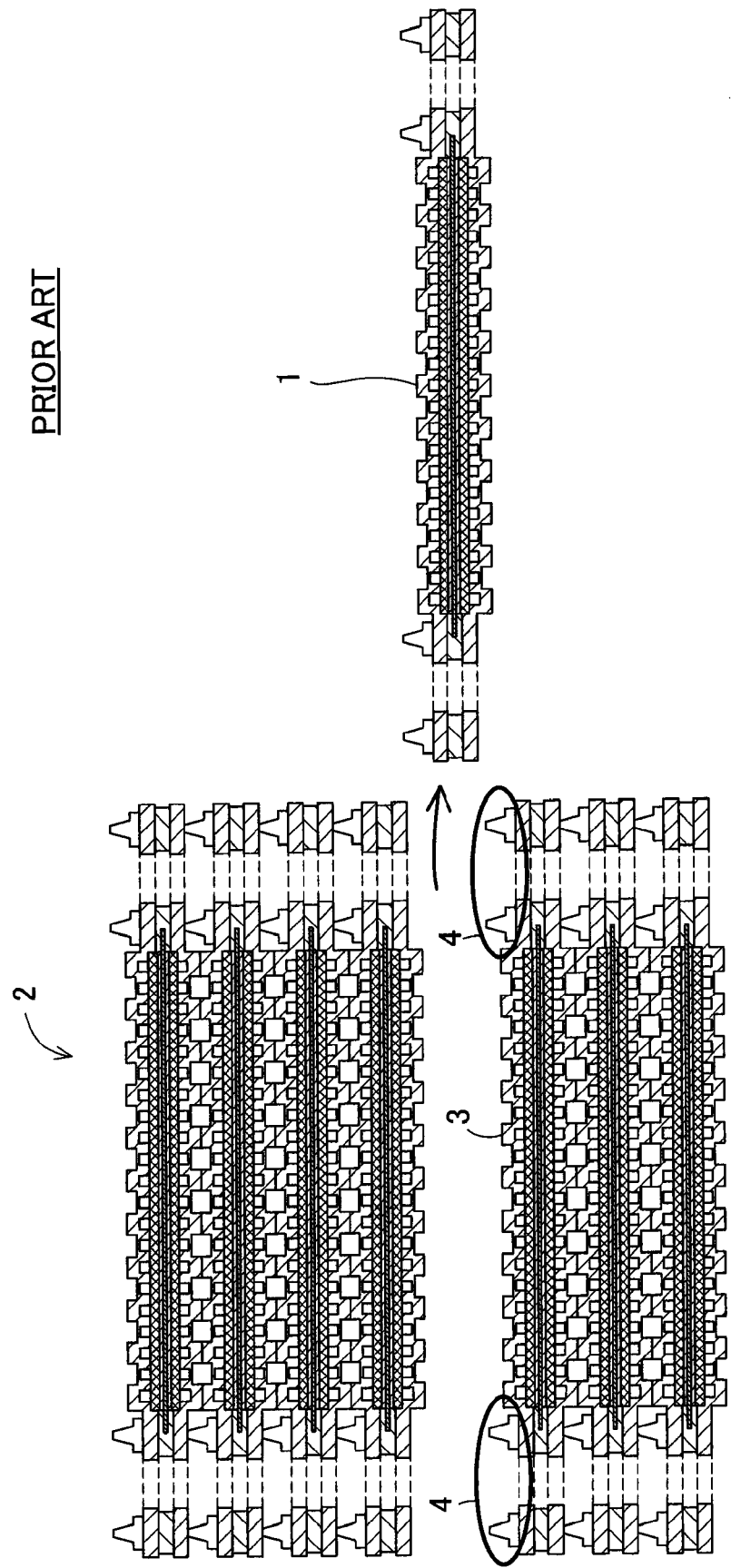
FIG. 1 illustrates the prior art stack configuration of fuel cells.
Figure 2:
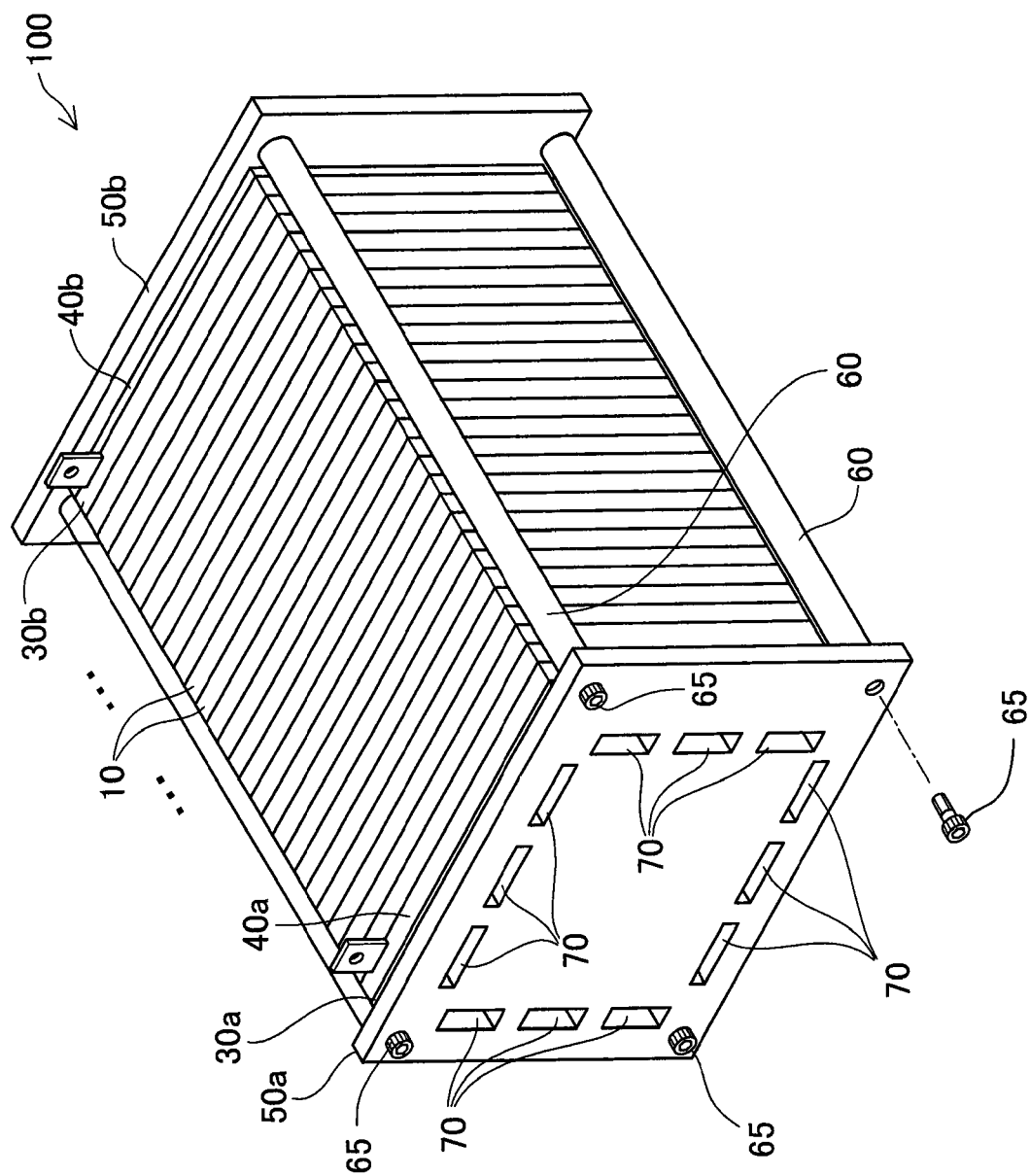
FIG. 2 is an appearance perspective of a fuel cell stack according to a first embodiment.
Figure 3:
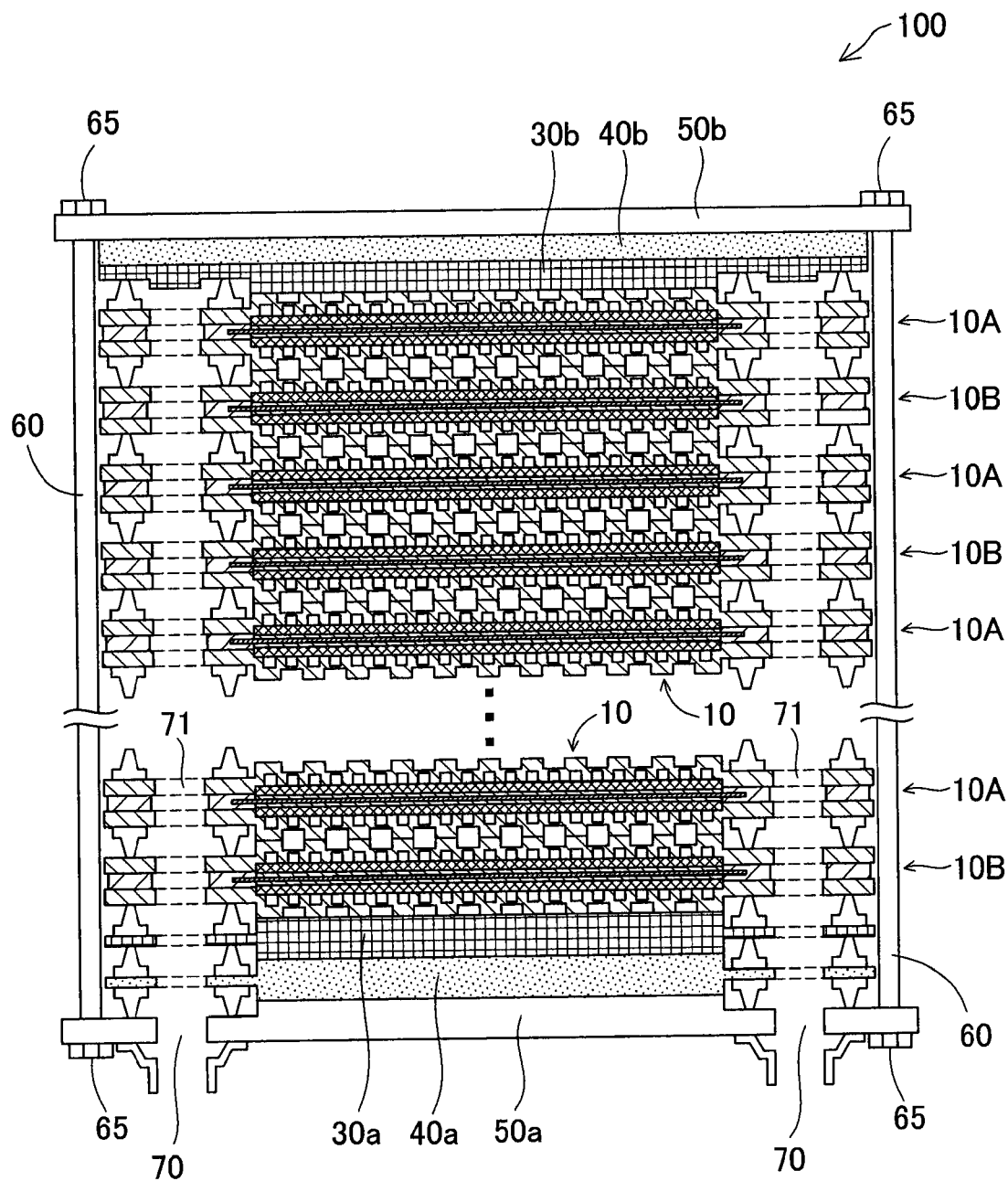
FIG. 3 is a cross sectional view of the fuel cell stack.

FIG. 2 is an appearance perspective of a fuel cell stack 100 according to a first embodiment of the invention, and FIG. 3 is a cross sectional view of the fuel cell stack 100. The fuel cell stack 100 is constructed by staking a plurality of solid polymer electrolyte fuel cells 10. Although this embodiment employs the solid polymer electrolyte fuel cells 10 to construct the fuel cell stack 100, another type of fuel cells, such as solid oxide fuel cells, may be used instead.

As shown in FIGS. 2 and 3, terminal plates 30a, 30b as power collectors and insulators 40a, 40b as insulating materials are provided on both ends of the fuel cell stack 100 and are further sandwiched between a pair of end plates 50a, 50b. Shafts 60 are placed at four corners of the fuel cell stack 100 and are fastened by means of bolts 65 on respective outer sides of the pair of end plates 50a and 50b, so that the respective fuel cells 10 are clamped by a certain force in their stacking direction (i.e., vertical direction of FIG. 3).

As shown in FIG. 2, manifolds 70 are formed at a plurality of different positions in the end plate 50a, the insulator 40a and the terminal plate 30a for the flows of hydrogen, the air and cooling water into the fuel cell stack 100. As shown in FIG. 3, each of the fuel cells 10 also has manifolds 71 formed at the positions corresponding to those of these manifolds 70. Hydrogen and the air are introduced into the respective fuel cells 10 and cooling water is introduced in between the respective fuel cells 10 via these manifolds 70 and 71.

Figure 4:
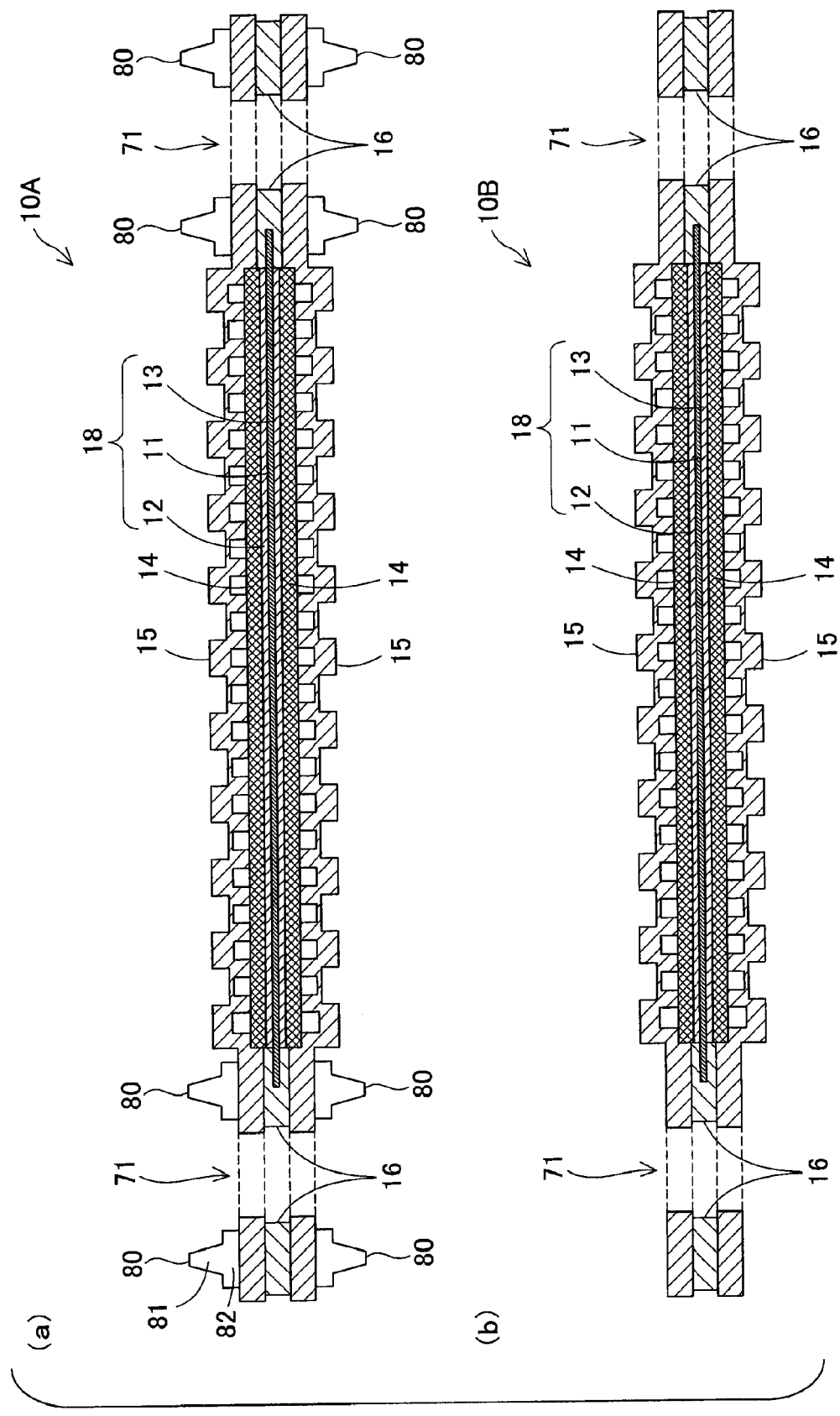
FIG. 4 illustrates the general structures of fuel cells.

FIG. 4 illustrates the general structures of the fuel cells 10. According to this embodiment, there are two different types of the fuel cells 10, depending on the presence or the absence of gaskets 80. FIG. 4(a) shows the cross section of a first fuel cell 10A with gaskets 80, and FIG. 4(b) shows the cross section of a second fuel cell 10B without gaskets 80. In the description hereinafter, when there is no need to make a distinction between the first fuel cell 10A and the second fuel cell 10B, they are collectively called "fuel cell 10".

The fuel cell 10 includes an anode catalyst layer 12 and a cathode catalyst layer 13 placed across an electrolyte membrane 11 and sandwiched between a pair of separators 15 via electrically-conductive and gas-permeable gas diffusion layers 14. Each of the separators 15 has a plurality of grooves formed on its inner surface for the flow of hydrogen or the flow of the air and a plurality of grooves formed on its opposite surface for the flow of cooling water. Bonding materials 16 made of, for example, laminate resin or adhesive are provided around the manifolds 71 and work to join the upper and lower separators 15 together. The anode catalyst layer 12 and its adjoining gas diffusion layer 14 correspond to the "anode" of the invention, and the cathode catalyst 13 and its adjoining gas diffusion layer 14 correspond to the "cathode" of the invention.

As shown in FIG. 4(a), gaskets 80 are placed around the periphery of the manifolds 71 of the first fuel cell 10A and are bonded to the upper surface of the upper separator 15 and to the lower surface of the lower separator 15. Each of the gaskets 80 has a polygonal cross section including an approximately triangular (or approximately isosceles trapezoidal) main body 81 and a plate-like base 82. The gasket 80 in this cross sectional shape accordingly has a bottom surface of a relatively wide area and an edge surface of the narrower area than that of the bottom surface. The bottom surface of each gasket 80 is bonded to the outer surface of the separator 15, and the edge surface of the gasket 80 is directed either upward or downward along the stacking direction of the first fuel cell 10A. The first fuel cell 10A with the gaskets 80 adhering to its two surfaces corresponds to the "first module" of the invention. As shown in FIG. 4(b), the second fuel cell 10B has no gaskets 80. The second fuel cell 10B without gaskets 80 corresponds to the "second module" and the "third module" of the invention. The gasket 80 corresponds to the "first sealing member" and the "second sealing member" of the invention.

Figure 5:
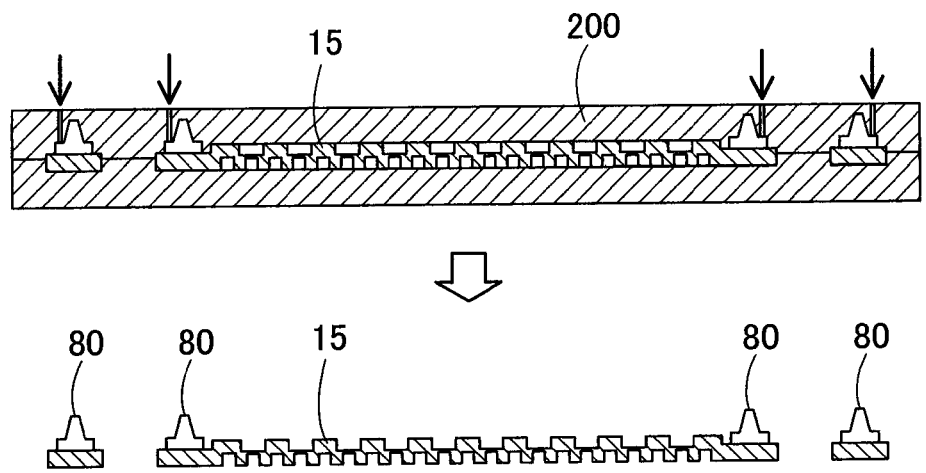
FIG. 5 illustrates one method of bonding gaskets to a separator.

FIG. 5 illustrates one method of bonding the gaskets 80 to the separator 15. The method employed in this embodiment places the separator 15 inside a mold 200, injects millable rubber or unvulcanized liquid rubber onto the separator 15 in the mold 200 and heats and cures the injected rubber, so as to bond the gaskets 80 to the separator 15. In other words, the method of this embodiment forms the gaskets 80 by injection molding, so as to bond the gaskets 80 to the separator 15. At this point, a primer or a vulcanized adhesive may be applied on the specific part of the surface of the separator 15, on which the gaskets 80 are molded, in order to ensure strong adhesion of the gaskets 80 to the separator 15. In another example, the specific part may be roughly polished, so that the strong adhesion is achieved by taking advantage of the anchor effect. In yet another example, an adhesive component may be mixed with the material rubber and used for bonding with no additional treatment on the separator 15. After bonding the gaskets 80 to the separator 15, the assembling procedure places the electrolyte membrane 11, the anode catalyst layer 12, the cathode catalyst layer 13 and the gas diffusion layers 14 between the two separators 15 with the gaskets 80 adhering thereto and joins the peripheries of the manifolds 71 together with the bonding materials 16, so as to complete the first fuel cell 10A. This method of bonding the gaskets 80 in advance to the separator 15 does not require the gaskets 80 to be heated during assembly of the first fuel cell 10A, thus advantageously preventing deterioration of the electrolyte membrane and the catalyst layers.

Figure 6:
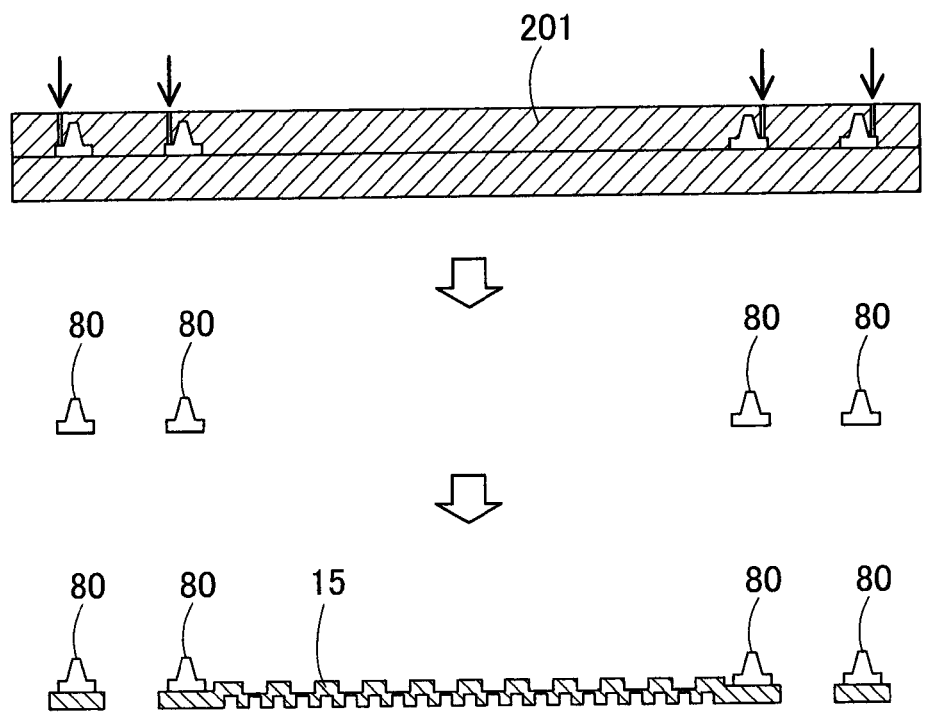
FIG. 6 illustrates another method of bonding gaskets to a separator.
Figure 7:
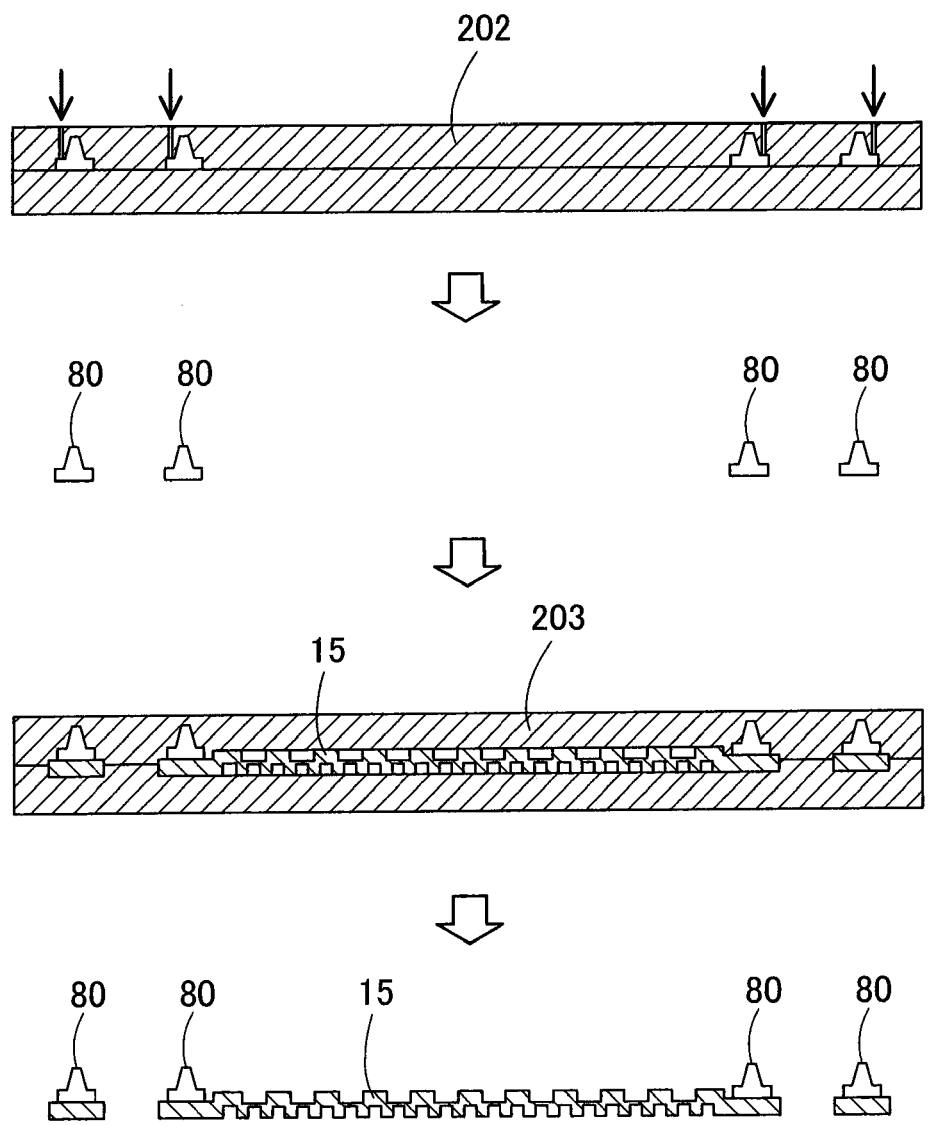
FIG. 7 illustrates yet another method of bonding gaskets to a separator.

Bonding the gaskets 80 to the separator 15 is not limited to this method, but various other methods may be employed for such adhesion. For example, as shown in FIG. 6, another method may first form only the gaskets 80 in a mold 201 by injection molding and subsequently bond the gaskets 80 to the separator 15 with an adhesive. As shown in FIG. 7, yet another method may first pre-form the gaskets 80 at a temperature of not completely curing the rubber in a mold 202 used for injection molding only the gaskets 80 and subsequently pressure-bond the pre-formed gaskets 80 to the separator 15 at a rubber-curing temperature in a mold 203 for compression molding. In these methods, as described above, the primer or the vulcanized adhesive may be applied on the surface of the separator 15; the separator surface may be roughly polished; or the adhesive component may be mixed with the material rubber.

According to this embodiment, the fuel cell stack 100 is constructed by alternately stacking the first fuel cells 10A with the gaskets 80 adhering thereto as explained above and the second fuel cells 10B without the gaskets 80 as shown in FIG. 3. Alternately stacking the first fuel cells 10A and the second fuel cells 10B causes the edge surface of the gasket 80 adhering to the first fuel cell 10A to be in close contact with the outer surface of the separator 15 of the second fuel cell 10B by intrinsic cohesion of the gasket 80 as the viscoelastic material. The gasket 80 then serves as the sealing member and prevents leakage of hydrogen, oxygen or cooling water from inside to outside the manifolds 71. This cohesion is the weaker force than the adhesive force of the gasket 80 to the separator 15. In other words, the peel strength of the gasket 80 against the first fuel cell 10A is greater than the peel strength of the gasket 80 against the second fuel cell 10B.

Figure 8:
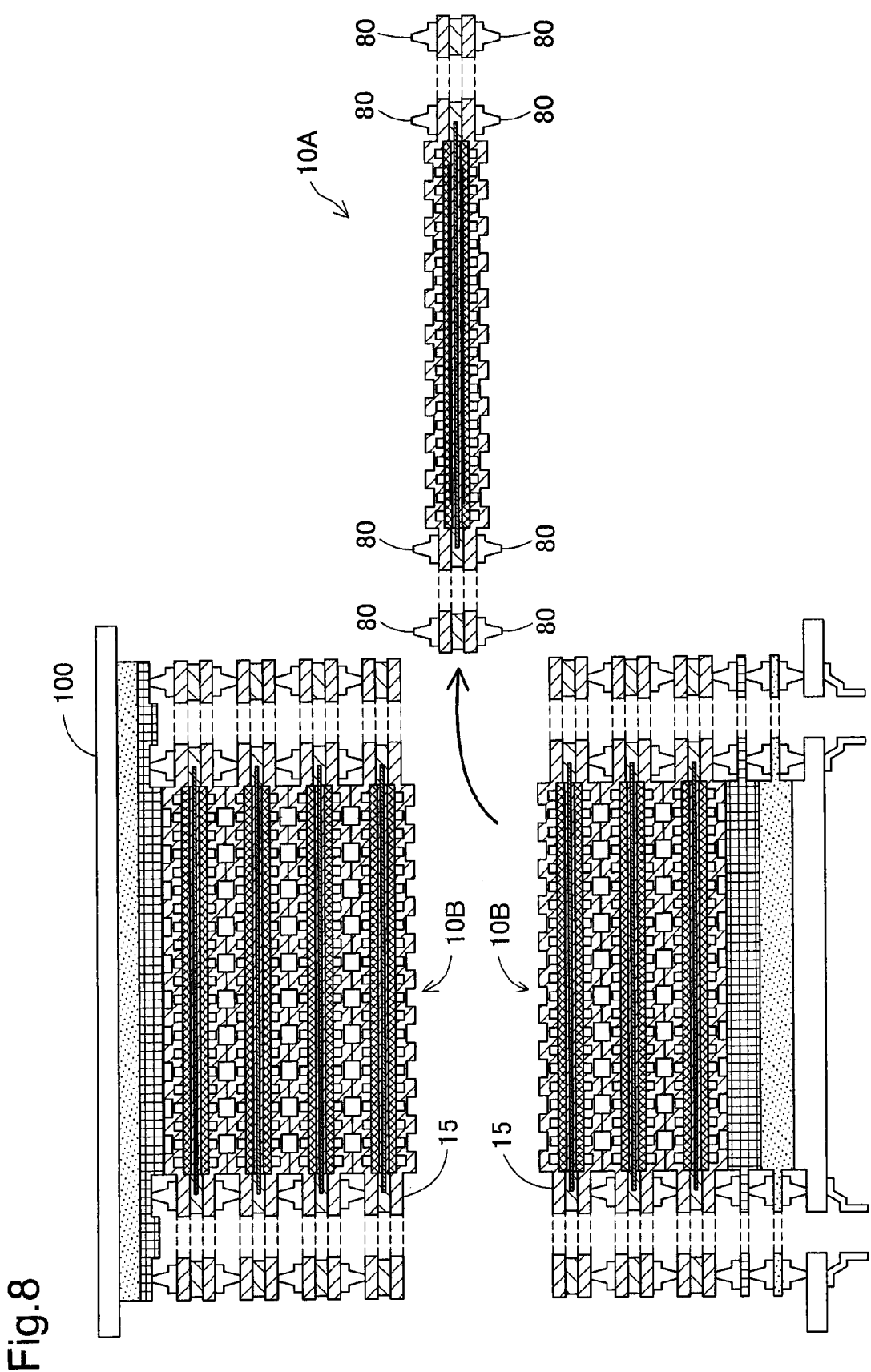
FIG. 8 illustrates a method of replacing a first fuel cell.

FIG. 8 illustrates a method of replacing the first fuel cell 10A in the fuel cell stack 100. The procedure of replacing the first fuel cell 10A in the fuel cell stack 100 first removes the bolts 65 and the shafts 60 to unclamp the fuel cell stack 100. The procedure subsequently opens the stack configuration at both surfaces of the first fuel cell 10A of interest as the replacement object and withdraws the first fuel cell 10A of interest. The force required for peeling the gaskets 80 off the first fuel cell 10A is greater than the force required for peeling the gaskets 80 off the second fuel cell 10B, so that the first fuel cell 10A of interest is withdrawn together with the gaskets 80 adhering to the two surfaces of the first fuel cell 10A. The separators 15 of the second fuel cells 10B respectively adjacent to the surfaces of the withdrawn first fuel cell 10A are accordingly exposed in the fuel cell stack 100. After withdrawal of the first fuel cell 10A of interest, the procedure places a new first fuel cell 10A in the fuel cell stack 100 and re-clamps the fuel cell stack 100 from both ends thereof with the shafts 60 and the bolts 65. This method of replacing the first fuel cell 10A does not cause the gaskets 80 to be exposed in the fuel cell stack 100 even when one single first fuel cell 10A is solely withdrawn, thus enabling the first fuel cell 10A to be handled as the module of the replacement unit (first replacement unit module).

Figure 9:
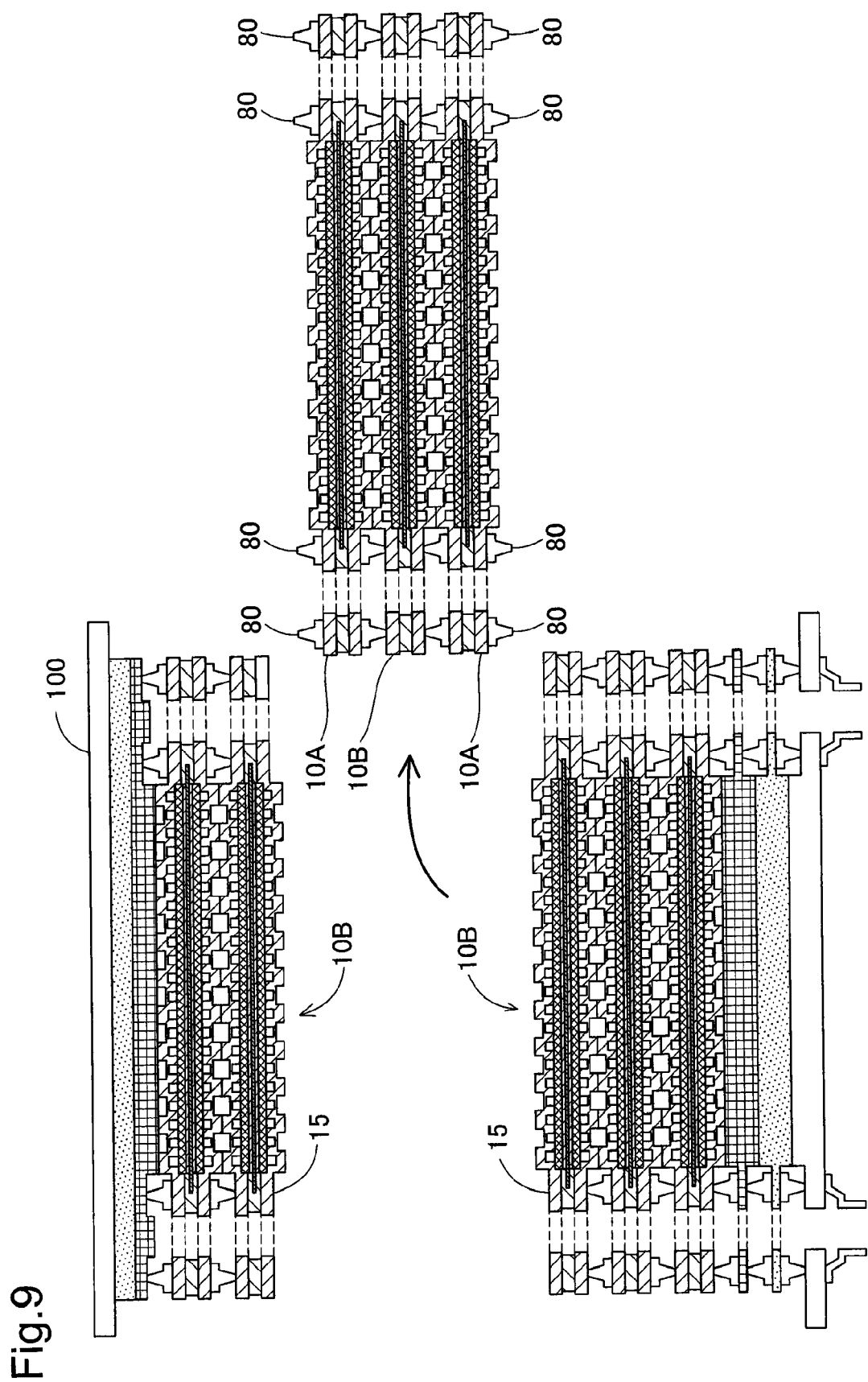
FIG. 9 illustrates a method of replacing a second fuel cell.

FIG. 9 illustrates a method of replacing the second fuel cell 10B in the fuel cell stack 100. The procedure of replacing the second fuel cell 10B in the fuel cell stack 100 first removes the bolts 65 and the shafts 60 to unclamp the fuel cell stack 100. The procedure subsequently opens the stack configuration at the respective outside surfaces of the first fuel cells 10A respectively adjacent to the surfaces of the second fuel cell 10B of interest as the replacement object and withdraws these three fuel cells 10 together. Withdrawing the three fuel cells 10 together from the fuel cell stack 100 causes the separators 15 of the second fuel cells 10B respectively adjacent to the two first fuel cells 10A withdrawn simultaneously with the second fuel cell 10B of interest to be exposed in the fuel cell stack 100. After withdrawal of the three fuel cells 10, the procedure places three new fuel cells 10 in the fuel cell stack 100 and re-clamps the fuel cell stack 100 from both ends thereof with the shafts 60 and the bolts 65. This method of replacing the second fuel cell 10B does not require replacement of all the fuel cells 10 present in one direction from the fuel cell 10 of interest as the actual replacement object unlike the prior art configuration, thus enabling the minimal set of the fuel cells 10 (i.e., one second fuel cell 10B and two first fuel cells 10A) to be handled as the module of the replacement unit (second replacement unit module).

According to the embodiment described above, the fuel cell stack 100 is formed by alternately stacking the first fuel cells 10A with the gaskets 80 adhering to the respective surfaces thereof and the second fuel cells 10B without the gaskets 80. For replacement of the first fuel cell 10A, the replacement unit is one single fuel cell 10. For replacement of the second fuel cell 10B, the replacement unit is three fuel cells 10 (i.e., one second fuel cell 10B and two first fuel cells 10A). This does not require replacement of all the fuel cells 10 present in one direction from the fuel cell 10 of interest as the actual replacement object unlike the prior art configuration, thus ensuring cost-saving replacement of the fuel cells 10.

The configuration of this embodiment allows replacement of the fuel cell 10 together with the gaskets 80 and accordingly does not require the gaskets 80 to be re-bonded in the unclamped unstable fuel cell stack 100. This advantageously prevents incorporation of any foreign substances during re-bonding the gaskets 80, as well as damage of the separator 15, misalignment of the gaskets 80 and heating-induced deterioration of the electrolyte membrane 11.

According to this embodiment, the edge surface of the gasket 80 adhering to the first fuel cell 10A is in close contact with the second fuel cell 10B by the intrinsic cohesion of the gasket 80. As long as the condition that the force required for peeling the gasket 80 off the first fuel cell 10A is greater than the force required for peeling the gasket 80 off the second fuel cell 10B is satisfied, the edge surface of the gasket 80 may be bonded to the second fuel cell 10B with an adhesive. As long as the above condition is satisfied, the bottom surface of the gasket 80 may be not bonded to but cohesively stuck to the first fuel cell 10A. The pair of separators 15 included in each fuel cell 10 are bonded by the bonding materials 16 according to the above embodiment, but may be cohesively stuck with the stronger force than the cohesion on the edge surface of the gasket 80.

B. Second Embodiment

According to the first embodiment described above, the fuel cell stack 100 is formed by alternately stacking the first fuel cells 10A with the gaskets 80 adhering to the respective surfaces thereof and the second fuel cells 10B without the gaskets 80. According to a second embodiment, two different types of multi-cell modules respectively including a plurality of fuel cells 10 are provided; one type of multi-cell module has the gaskets 80 adhering to both the surfaces thereof, and the other type of multi-cell module does not have the gaskets 80.

Figure 10:
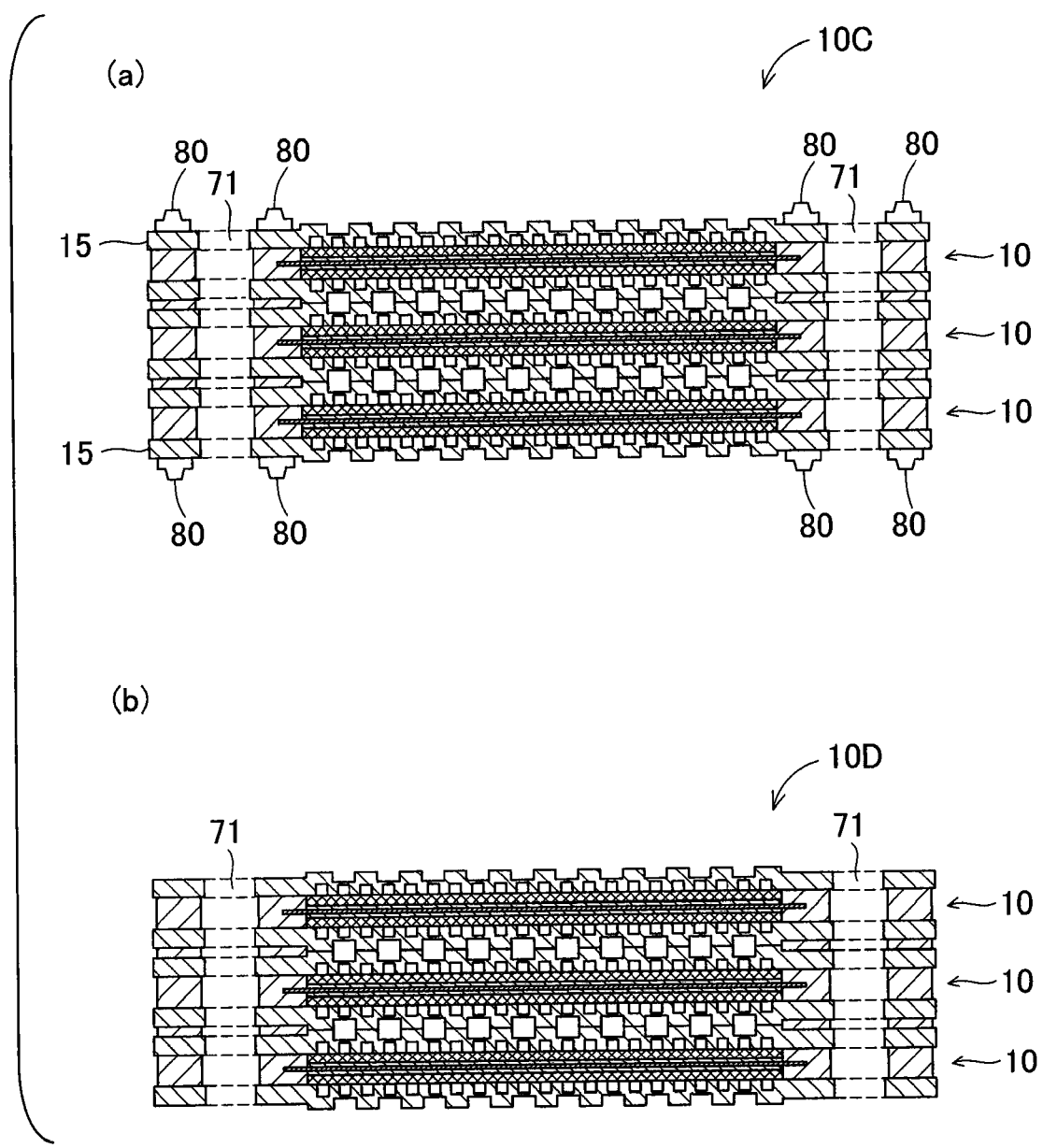
FIG. 10 illustrates the general structures of multi-cell modules according to a second embodiment.

FIG. 10 illustrates the general structures of these multi-cell modules as the constituents of a fuel cell stack according to this embodiment. FIG. 10(a) shows the cross section of a first multi-cell module 10C, and FIG. 10(b) shows the cross section of a second multi-cell module 10D. As shown in FIGS. 10(a) and 10(b), the first multi-cell module 10C and the second multi-cell module 10D are both constructed by stacking three fuel cells 10. Each of the fuel cells 10 has the same structure as that of the first embodiment and includes an assembly of an electrolyte membrane, an anode and a cathode sandwiched between a pair of separators via gas diffusion layers. According to this embodiment, the three fuel cells 10 constituting the first multi-cell module 10C or the second multi-cell module 10D are integrated by joining the peripheries of the manifolds 71 together with a joining material, such as laminate resin or adhesive, or by blazing.

As shown in FIG. 10(a), the first multi-cell module 10C has the gaskets 80 bonded to the top separator 15 and the bottom separator 15. The same method as that described in the first embodiment is employed to bond the gaskets 80 to the separator 15. As shown in FIG. 10(b), on the other hand, the second multi-cell module 10D has no gaskets 80. According to this embodiment, the first multi-cell module 10C corresponds to the "first module" of the invention, and the second multi-cell module 10D corresponds to the "second module" and the "third module" of the invention.

Figure 11:
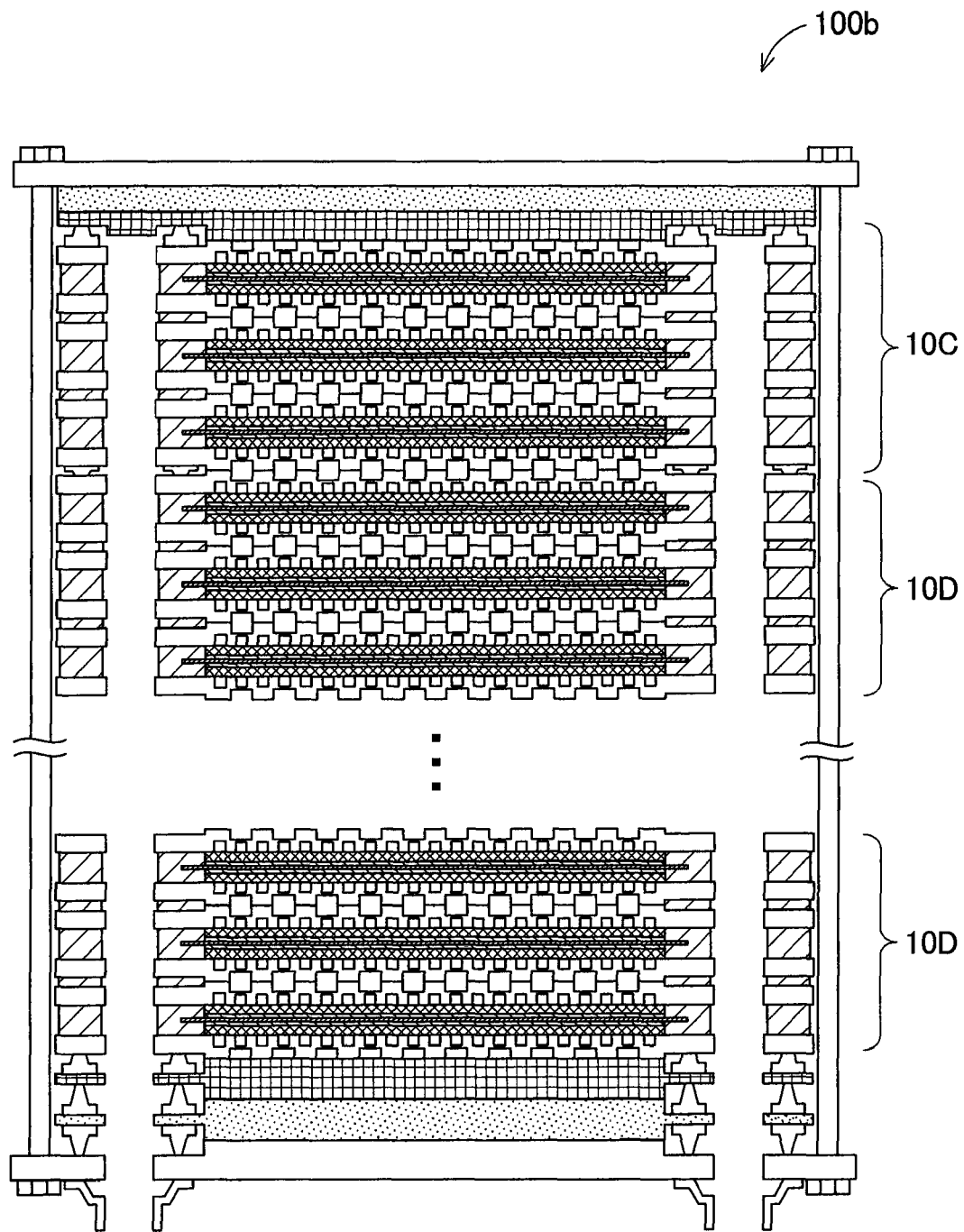
FIG. 11 is a cross sectional view of a fuel cell stack according to the second embodiment.

FIG. 11 is a cross sectional view of a fuel cell stack 100b according to the second embodiment of the invention. As shown in FIG. 11, the fuel cell stack 100b of this embodiment is constructed by alternately stacking the first multi-cell modules 10C and the second multi-cell modules 10D explained above. It is assumed that a certain fuel cell 10 is to be replaced in the fuel cell stack 100b of this configuration. When the fuel cell 10 of interest is included in the first multi-cell module 10C, the fuel cell 10 of interest is replaced by replacing the entire first multi-cell module 10C. When the fuel cell 10 of interest is included in the second multi-cell module 10D, on the other hand, the fuel cell 10 of interest is replaced by replacing three multi-cell modules together, i.e., the second multi-cell module 10D of interest and a pair of first multi-cell modules 10C respectively adjacent to the surfaces of the second multi-cell module 10D of interest. In other words, according to this embodiment, when the fuel cell 10 of interest is included in the first multi-cell module 10C, replacement of three fuel cells 10 is required. When the fuel cell 10 of interest is included in the second multi-cell module 10D, replacement of nine fuel cells 10 is required. In either case, it is not required to replace all the fuel cells 10 present in one direction from the fuel cell 10 of interest as the actual replacement object unlike the prior art configuration, thus ensuring cost-saving replacement of the fuel cells 10. Additionally, like the first embodiment, the configuration of this embodiment does not require the gaskets 80 to be re-bonded in the unclamped unstable fuel cell stack 100. This advantageously prevents incorporation of any foreign substances during re-bonding the gaskets 80, as well as damage of the separator 15, misalignment of the gaskets 80 and heating-induced deterioration of the electrolyte membrane 11.

The first multi-cell module 10C and the second multi-cell module 10D respectively include three fuel cells 10 according to this embodiment, but may include an arbitrary number of fuel cells 10. For example, both the first multi-cell module 10C and the second multi-cell module 10D may include two fuel cells 10 or may include four or more fuel cells 10. According to another embodiment, the first multi-cell module 10C and the second multi-cell module 10D may include different numbers of fuel cells 10. For example, the first multi-cell module 10C may include two fuel cells 10, while the second multi-cell module 10D may include three fuel cells 10.

C. Third Embodiment

According to the first embodiment described above, the first fuel cell 10A and the second fuel cell 10B respectively include one fuel cell 10. According to the second embodiment, the first multi-cell module 10C and the second multi-cell module 10D respectively include a plurality of fuel cells 10. According to a third embodiment, however, a fuel cell stack is constructed by alternately stacking first modules and second modules, which are respectively formed as half-finished fuel cell parts.

Figure 12:
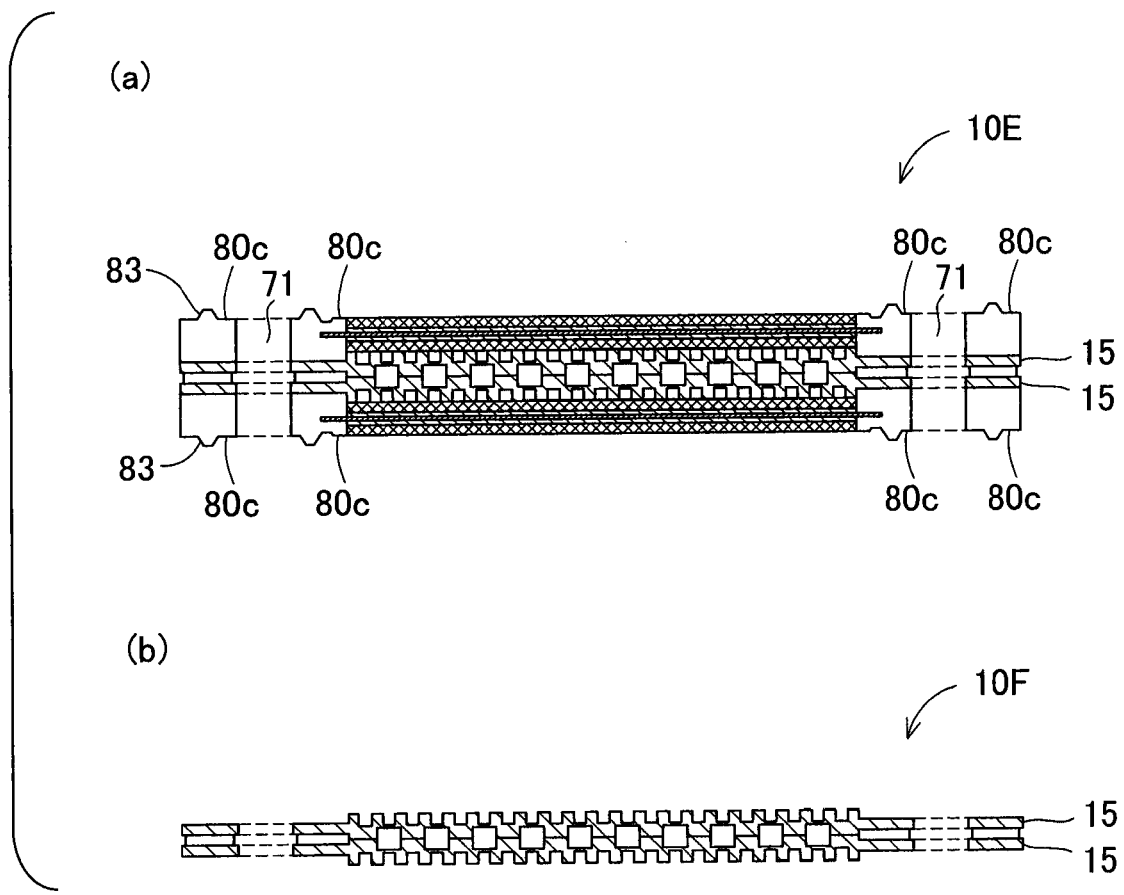
FIG. 12 illustrates the general structures of modules according to a third embodiment.

FIG. 12 illustrates the general structures of the modules as the constituents of the fuel cell stack according to this embodiment. FIG. 12(a) shows the cross section of a first module 10E, and FIG. 12(b) shows the cross section of a second module 10F. As shown in FIG. 12(a), the first module 10E of this embodiment is formed by joining two fuel cells together, which respectively have the separators 15 only on their inside surfaces but do not have the separators 15 on their outside surfaces, at the peripheries of the manifolds 71, for example, with an adhesive or by blazing. Gaskets 80c are integrally formed around the periphery of the electrolyte membrane by injection molding in each of the fuel cells. Each of the gaskets 80c has a convex 83 directed upward or downward of the first module 10E. As shown in FIG. 12(b), the second module 10F is formed by bonding two separators 15 together on their back surfaces, for example, with an adhesive or by blazing, and has no gaskets.

Figure 13:
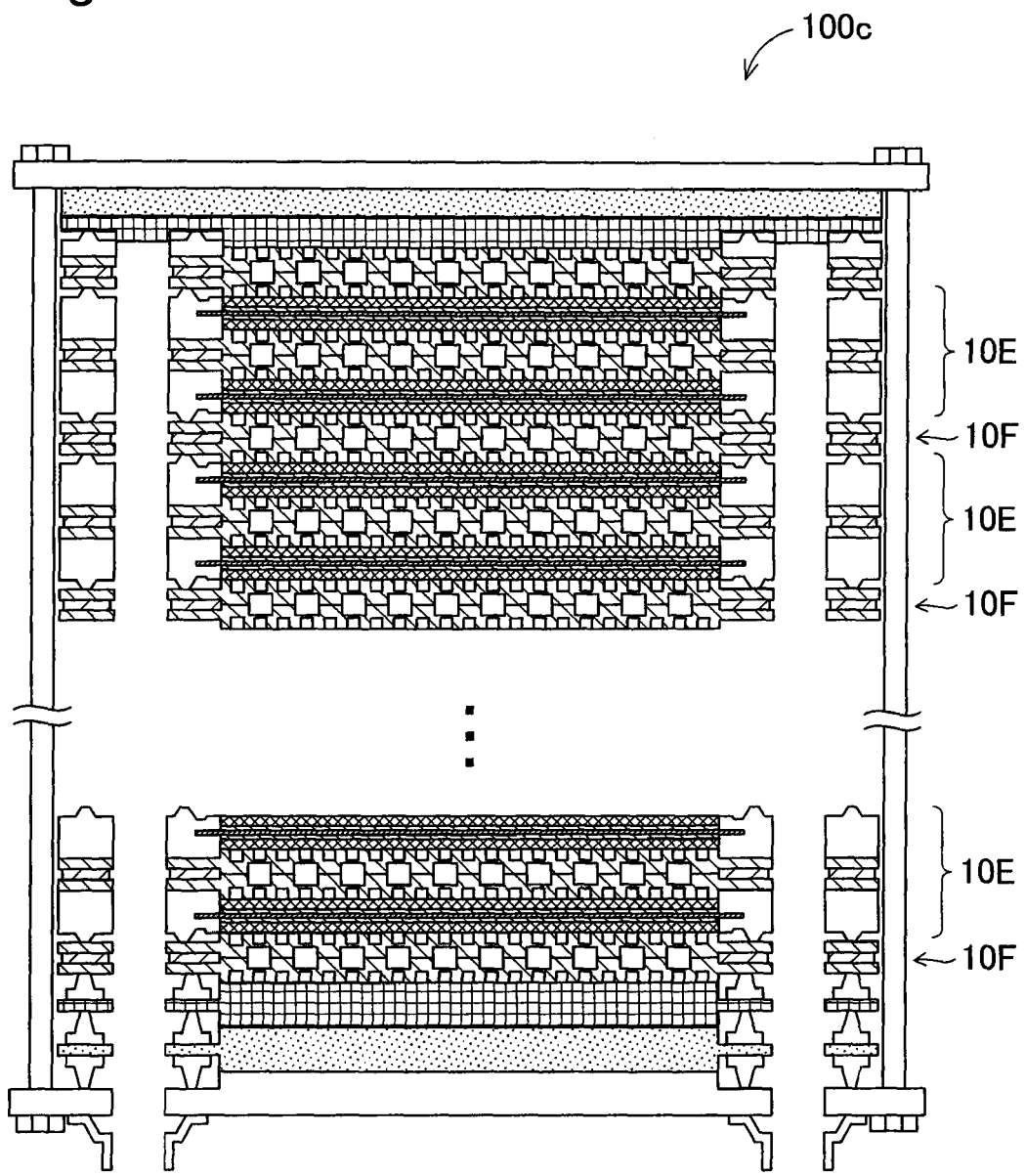
FIG. 13 is a cross sectional view of a fuel cell stack according to the third embodiment.

FIG. 13 illustrates the configuration of a fuel cell stack 100c according to this embodiment. As shown in FIG. 13, the fuel cell stack 100c of this embodiment is formed by alternately stacking the first modules 10E and the second modules 10F described above. It is assumed that a certain fuel cell 10 is to be replaced in the fuel cell stack 100c of this configuration. The fuel cell of interest is replaced by simply withdrawing the first module 10E alone without making the gaskets 80c exposed in the fuel cell stack 100c. The configuration of this embodiment thus also ensures cost-saving replacement of the fuel cells. Additionally, like the first embodiment, the configuration of this embodiment does not require the gaskets 80c to be re-bonded in the unclamped unstable fuel cell stack 100. This advantageously prevents incorporation of any foreign substances during re-bonding the gaskets, as well as damage of the separator, misalignment of the gaskets and heating-induced deterioration of the electrolyte membrane.

The foregoing has described the invention in detail with reference to the illustrative embodiments. The invention is, however, not limited to the above embodiments, but a multiplicity of variants and modifications may be made to the embodiments without departing from the scope of the invention. Some examples of possible modifications are described below.

According to the above embodiments, the gaskets 80 are used as the sealing members between the fuel cells 10. According to another embodiment, the sealing member is not limited to the gasket but may be any of various sealing members that prevent leakage of hydrogen or the air due to the internal pressure of the manifolds 71, for example, O-ring or rubber sheet.

According to the above embodiments, the gasket 80 is bonded and fixed to the separator 15 of the fuel cell 10. According to another embodiment, the gasket 80 may be formed to have a hook-like projection, which is fit and thereby fixed in a hole formed in the separator 15.

According to the above embodiments, the gaskets 80 adhering to the respective surfaces of the fuel cell 10 are bonded to the upper surface and the lower surface of the fuel cell 10 with the same adhesive force. According to another embodiment, the gaskets 80 may be bonded to the upper surface and the lower surface of the fuel cell 10 with different adhesive forces. In this latter case, the different adhesive forces should be both greater than the intrinsic cohesion of the gaskets 80.

REFERENCE SIGNS LIST

10 Fuel Cell
10a First Fuel Cell
10b Second Fuel Cell
10c First Multi-Cell Module
10d Second Multi-Cell Module
10e First Module
10f Second Module
11 Electrolyte Membrane
12 Anode Catalyst Layer
13 Cathode Catalyst Layer
14 Gas Diffusion Layers
15 Separator
16 Bonding Materials
30a, 30b Terminal Plates
40a, 40b Insulators
50a, 50b End Plates
60 Shaft
65 Bolt
70, 71 Manifolds
80, 80c Gaskets
80c Gaskets
100, 100b, 100c Fuel Cell Stacks
200, 201, 202, 203 Molds

The invention claimed is:

1. A fuel cell stack configured by stacking a plurality of modules, comprising:
a first module;
a second module placed adjacent to one surface of the first module via a first sealing member; and
a third module placed adjacent to the other surface of the first module via a second sealing member, wherein
the first sealing member has greater peel strength to the first module than peel strength to the second module, and
the second sealing member has greater peel strength to the first module than peel strength to the third module,
wherein the first module, the second module and the third module respectively have one or more fuel cells, each fuel cell including an electrolyte membrane, an anode, a cathode and a pair of separators placed on the outermost portions of the first, second, and third modules in such a way as to hold the electrolyte membrane, the anode and the cathode,
wherein a contact area of the first sealing member against the first module is greater than a contact area of the first sealing member against the second module, and
wherein a contact area of the second sealing member against the first module is greater than a contact area of the second sealing member against the third module,
wherein the first sealing member comes into contact with one of the pair of the separators provided in the first module, and one of the pair of the separators provided in the second module, and
wherein the second sealing member comes into contact with the other one of the pair of the separators provided in the first module, and one of the pair of the separators provided in the third module.

2. The fuel cell stack according to claim 1, wherein
the separator included in the second module is placed adjacent to either the anode or the cathode of the first module, and
the separator included in the third module is placed adjacent to either the anode or the cathode of the first module.

3. The fuel cell stack according to claim 1, wherein
the first sealing member is bonded to the first module and is cohesively stuck to the second module, and
the second sealing member is bonded to the first module and is cohesively stuck to the third module.

4. The fuel cell stack according to claim 1, wherein
the second module and the third module have an identical configuration, and
multiple sets of the first sealing member, the first module, the second sealing member and the second module arranged in this order are stacked.

* * * * *